United States Patent
Mukherjee et al.

(10) Patent No.: US 11,950,192 B2
(45) Date of Patent: Apr. 2, 2024

(54) TRANSCEIVERS WITH ADJUSTABLE CELL SIZES

(71) Applicant: Cypress Semiconductor Corporation, San Jose, CA (US)

(72) Inventors: Suprojit Mukherjee, Kalyani (IN); Munukutla Sandeep Sarma, Bangalore (IN); Raghavendra Kencharla, Bangalore (IN); Ayush Sood, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 208 days.

(21) Appl. No.: 17/502,206

(22) Filed: Oct. 15, 2021

(65) Prior Publication Data
US 2023/0120389 A1    Apr. 20, 2023

(51) Int. Cl.
*H04W 4/80*   (2018.01)
*H04W 52/44*   (2009.01)
*H04W 84/12*   (2009.01)
*H04W 88/06*   (2009.01)

(52) U.S. Cl.
CPC .............. *H04W 52/44* (2013.01); *H04W 4/80* (2018.02); *H04W 84/12* (2013.01); *H04W 88/06* (2013.01)

(58) Field of Classification Search
CPC ........ H04W 52/44; H04W 4/80; H04W 88/06
See application file for complete search history.

(56) References Cited

U.S. PATENT DOCUMENTS 10,098,083 B2 * 10/2018 Sun ........................... H04L 1/00
2011/0212696 A1 * 9/2011 Hahn ..................... H04B 1/525
455/83

* cited by examiner

*Primary Examiner* — Tuan H Nguyen (57) ABSTRACT

One example of a device includes a Bluetooth transceiver, a Wireless Local Area Network (WLAN) transceiver, and a controller. The WLAN transceiver is proximate the Bluetooth transceiver. The controller is communicatively coupled to the Bluetooth transceiver and the WLAN transceiver. The controller is configured to adjust a cell size of the WLAN transceiver or the Bluetooth transceiver to reduce interference between WLAN transceiver traffic and Bluetooth transceiver traffic.

5 Claims, 7 Drawing Sheets

TRANSCEIVERS WITH ADJUSTABLE CELL SIZES

BACKGROUND

In the 2G spectrum, the coexistence of Bluetooth and Wi-Fi has gained significant interest in the market. Combination system chips may include both Bluetooth and Wireless Local Area Network (WLAN) transceivers. Since Bluetooth and Wi-Fi share the same spectrum, there may be interference between the Bluetooth and Wi-Fi signals. This interference may degrade the performance of both the Bluetooth and WLAN transceivers. To avoid this interference, techniques, such as Time Division Multiplexing (TDM) of the Bluetooth and Wi-Fi signals or increasing the board isolation between the Bluetooth and Wi-Fi antennas, may be utilized. These techniques, however, may reduce the performance and/or increase the cost of the Bluetooth and WLAN transceiver systems.

For these and other reasons, a need exists for the present disclosure.

SUMMARY

One example of a device includes a Bluetooth transceiver, a Wireless Local Area Network (WLAN) transceiver, and a controller. The WLAN transceiver is proximate the Bluetooth transceiver. The controller is communicatively coupled to the Bluetooth transceiver and the WLAN transceiver. The controller is configured to adjust a cell size of the WLAN transceiver or the Bluetooth transceiver to reduce interference between WLAN transceiver traffic and Bluetooth transceiver traffic.

Another example of a device includes a Bluetooth transceiver, a Wireless Local Area Network (WLAN) transceiver, and a controller. The controller is configured to in response to a maximum WLAN transmit power to sustain Bluetooth traffic at a given Bluetooth metric being greater than a WLAN transmit power to sustain WLAN traffic at a highest WLAN rate for a given WLAN metric, enable WLAN traffic in parallel with Bluetooth traffic, and limit WLAN transmit power to the WLAN transmit power to sustain WLAN traffic at the highest rate for the WLAN metric. The controller is further configured to in response to the maximum WLAN transmit power to sustain Bluetooth traffic at the given Bluetooth metric being greater than a WLAN transmit power to sustain a first percentage of the highest WLAN rate, enable WLAN traffic in parallel with Bluetooth traffic, limit WLAN transmit power to the WLAN transmit power to sustain the first percentage of the highest WLAN rate, and limit the WLAN rate to the first percentage of the highest WLAN rate. The controller is further configured to in response to the maximum WLAN transmit power to sustain Bluetooth traffic at the given Bluetooth metric being less than the WLAN transmit power to sustain WLAN traffic at the highest WLAN rate for the given WLAN metric and in response to the maximum WLAN transmit power to sustain Bluetooth traffic at the given Bluetooth metric being less than the WLAN transmit power to sustain the first percentage of the highest WLAN rate, enable WLAN reception in parallel with Bluetooth transmission and reception, and disable WLAN transmission in parallel with Bluetooth reception.

Another example of a device includes a Bluetooth transceiver, a Wireless Local Area Network (WLAN) transceiver including a WLAN receiver, and a controller. The controller is configured to limit Bluetooth transmit power to a first transmit power to sustain Bluetooth traffic at a given Bluetooth metric. The controller is further configured to in response to a given WLAN metric being less than a first value, disable WLAN traffic in parallel with Bluetooth traffic. The controller is further configured to in response to the given WLAN metric being greater than the first value, reduce a front end gain of the WLAN receiver during Bluetooth transmission, and enable WLAN traffic in parallel with Bluetooth transmission.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The cell size of a transceiver is the area up to which a peer device can receive a signal from the transceiver. In some applications, the cell size of a transceiver may be larger than needed for a peer device to receive a signal. The transmit power of a Wireless Local Area Network (WLAN) transceiver is proportional to the cell size. As the transmit power is increased, the cell size is increased. As transmit power is increased, however, interference with other co-located transceivers (e.g., Bluetooth transceivers) also increases. Accordingly, disclosed herein are systems and methods to optimize the cell size of a WLAN transceiver to reduce interference to a co-located Bluetooth transceiver. The cell size of the WLAN transceiver is optimized to reduce interference while increasing the performance of both the WLAN transceiver and the Bluetooth transceiver without any cost increase. Also disclosed herein is protection of a Bluetooth transceiver in the presence of a WLAN signal. To keep costs down, low cost boards including low isolation and low cost Bluetooth transceivers may be used. To protect a Bluetooth transceiver from a high incoming WLAN signal from a co-located WLAN transceiver, the duty cycle of the WLAN transceiver may be restricted to a defined percentage. In this way, the Bluetooth transceiver may sufficiently cool down in the duration when there is no WLAN activity to protect the Bluetooth transceiver from excessively heating.

Figure 1:
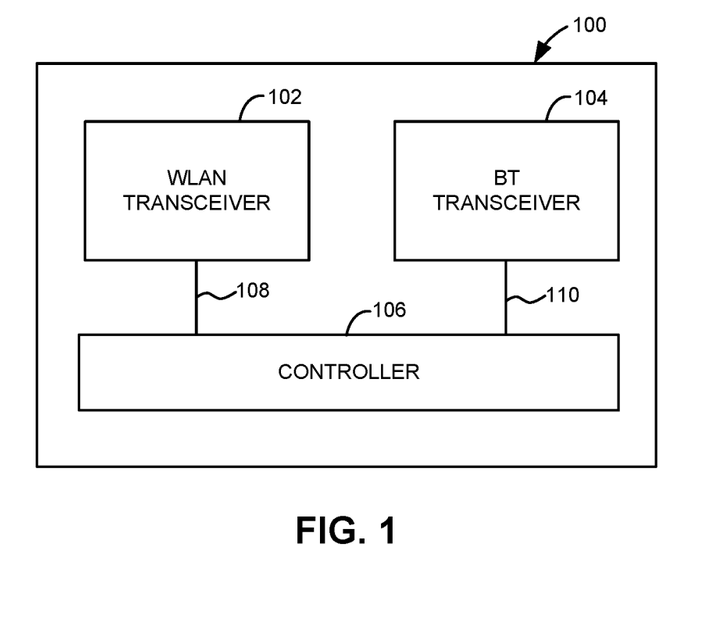
FIG. 1 is a block diagram illustrating one example of a device including a Wireless Local Area Network (WLAN) transceiver and a Bluetooth transceiver.

FIG. 1 is a block diagram illustrating one example of a device 100. Device 100 includes a WLAN transceiver 102, a Bluetooth transceiver 104, and a controller 106. Controller 106 is communicatively coupled to WLAN transceiver 102 through a communication path 108 and to Bluetooth transceiver 104 through a communication path 110. Device 100 may include other components, such as a display, input device(s), memory, etc. (not shown). For example, device 100 may be a desktop computer, a laptop computer, a tablet, a mobile phone, a gaming system, a smart home device, or other suitable device including both a WLAN transceiver and a Bluetooth transceiver. In some examples, the WLAN transceiver 102 and the Bluetooth transceiver 104 may be co-located on the same semiconductor chip. In other examples, the WLAN transceiver 102 and the Bluetooth transceiver 104 may be separate semiconductor chips proximate to each other within device 100.

Controller 106 may be a Central Processing Unit (CPU), microprocessor, microcontroller, Application Specific Integrated Circuit (ASIC), or other suitable logic circuitry for controlling the operation of WLAN transceiver 102 and Bluetooth transceiver 104. In some examples, controller 106 or portions of controller 106 may be integrated within WLAN transceiver 102 and/or Bluetooth transceiver 104. Controller 106 is configured to adjust a cell size of the WLAN transceiver 102 and/or the Bluetooth transceiver 104 to reduce interference between WLAN transceiver traffic (e.g., transmit and receive signals) and Bluetooth transceiver traffic (e.g., transmit and receive signals). In one example, the controller 106 is configured to adjust the cell size of the WLAN transceiver 102 by reducing a WLAN transmit power from a first level to a second level. In another example, the controller 106 is configured to adjust the cell size of the WLAN transceiver 102 by reducing a WLAN transmission rate from a first rate to a second rate. In another example, the controller 106 is configured to adjust the cell size of the Bluetooth transceiver by reducing a Bluetooth transmit power from a first level to a second level. In another example, the controller 106 is configured to limit a WLAN transmission duty cycle to a first duty cycle during Bluetooth transmissions.

Figure 2A:
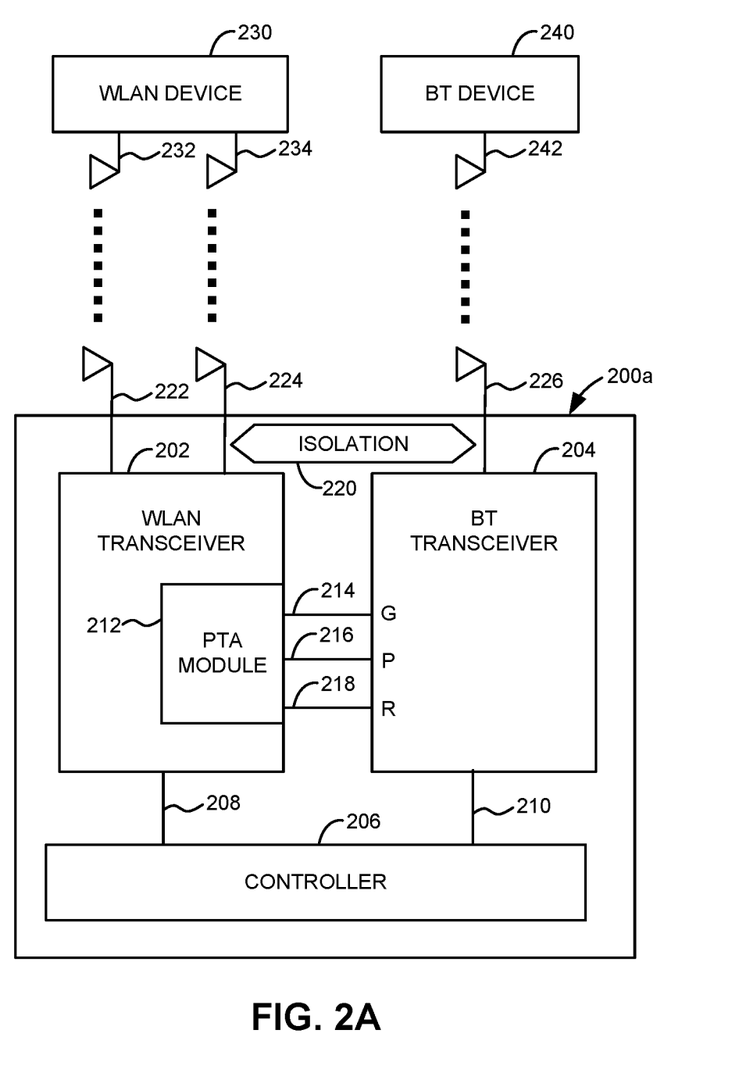
FIGS. 2A and 2B are block diagrams illustrating examples of systems including a device, such as the device of FIG. 1.

FIG. 2A is a block diagram illustrating one example of a system including a device 200a. Device 200a may be similar to device 100 previously described and illustrated with reference to FIG. 1. Device 200a includes a WLAN transceiver 202, a Bluetooth transceiver 204, a controller 206, and isolation 220. Controller 206 is communicatively coupled to WLAN transceiver 202 through a communication path 208 and to Bluetooth transceiver 204 through a communication path 210. Controller 206 may be a CPU, microprocessor, microcontroller, ASIC, or other suitable logic circuitry for controlling the operation of WLAN transceiver 202 and Bluetooth transceiver 204.

WLAN transceiver 202 includes a Packet Traffic Arbitration (PTA) module 212. PTA module 212 is electrically coupled to Bluetooth transceiver 204 via a 3-wire interface including a Grant (G) line 214, a Priority (P) line 216, and a Request (R) line 218. The priority line 216 may be used to transmit a Bluetooth Received Signal Strength Indicator (RSSI), a Bluetooth Signal to Noise Ratio (SNR), and/or a Bluetooth transmit power from the Bluetooth transceiver 204 to the WLAN transceiver 202.

WLAN transceiver 202 includes antennas 222 and 224. Bluetooth transceiver 204 includes an antenna 226. A WLAN device 230 including antennas 232 and 234 may wirelessly communicate with WLAN transceiver 202. A Bluetooth device 240 including an antenna 242 may wirelessly communicate with Bluetooth transceiver 204. In one example, isolation 220 between the WLAN transceiver 202 and the Bluetooth transceiver 204 is greater than 20 dB (e.g., 25 dB). In another example, isolation 220 between the WLAN transceiver 202 and the Bluetooth transceiver 204 is less than 20 dB (e.g., 15-20 dB). As described in more detail below, controller 206 is configured to adjust a cell size of the WLAN transceiver 202 and/or the Bluetooth transceiver 204 to reduce interference between WLAN transceiver traffic and Bluetooth transceiver traffic while maintaining communications with WLAN device 230 and Bluetooth device 240.

Figure 2B:
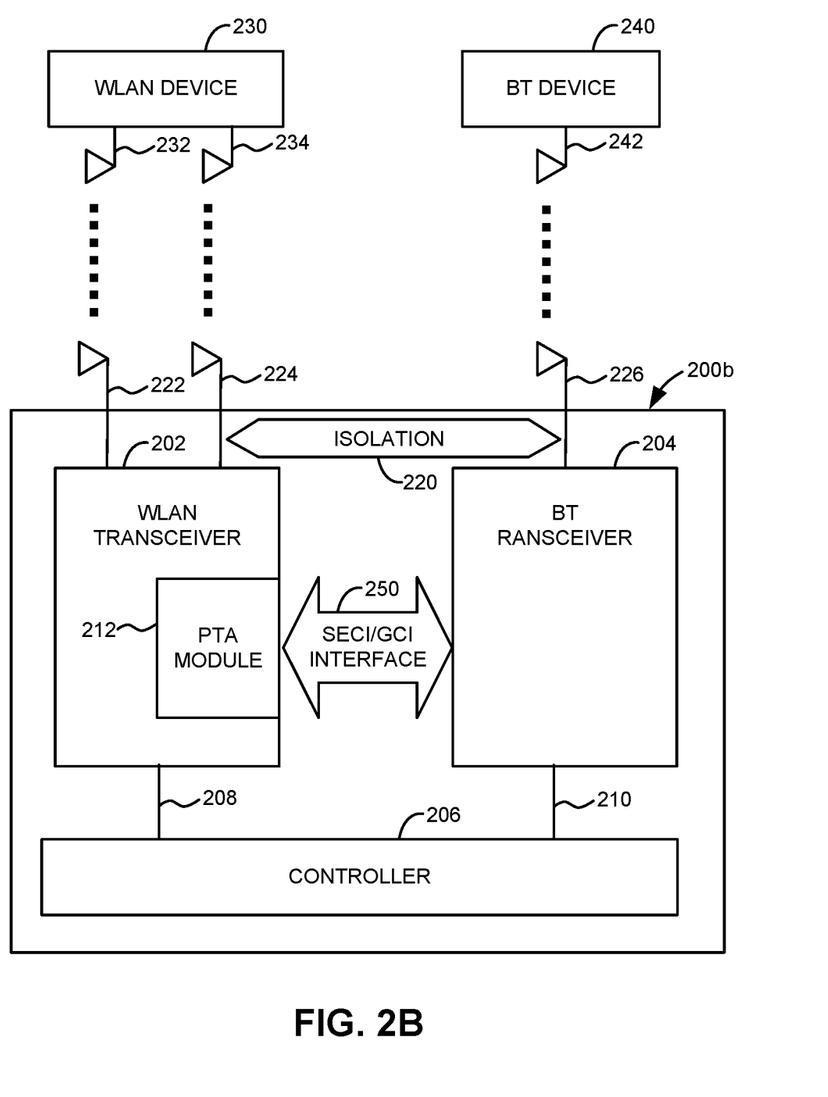

FIG. 2B is a block diagram illustrating another example of a system including a device 200b. Device 200b is similar to device 200a previously described and illustrated with reference to FIG. 2A, except that in device 200b, a Serial Enhanced Coexistence Interface (SECI)/Global Coexistence Interface (GCI) interface 250 is used in place of the 3-wire interface 214, 216, and 218.

Figure 3A:
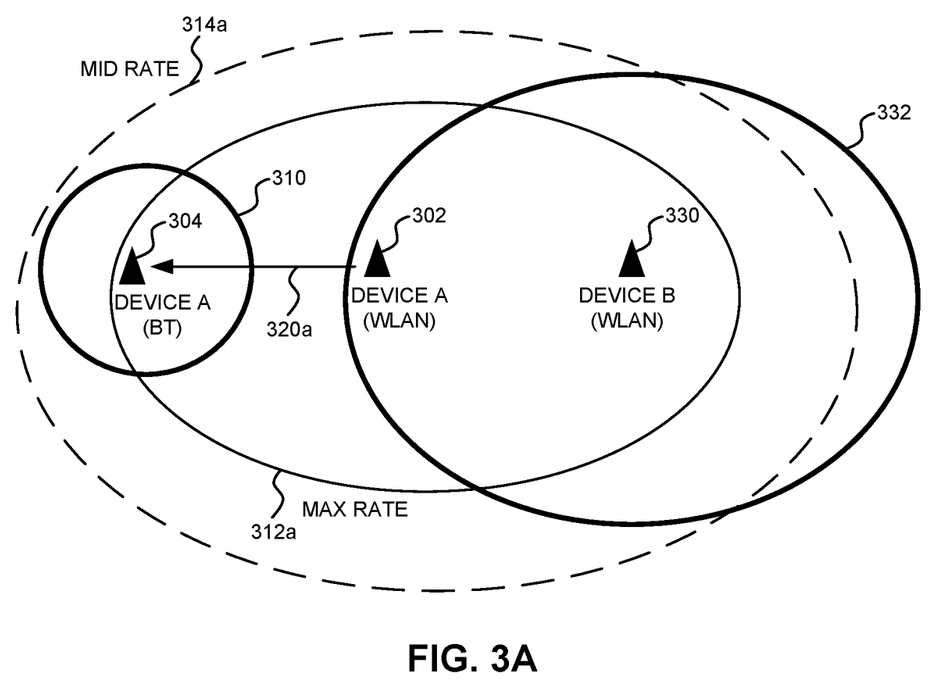
FIGS. 3A and 3B illustrate cell sizes before and after adjusting a WLAN transceiver cell size, respectively, according to an embodiment.
Figure 3B:
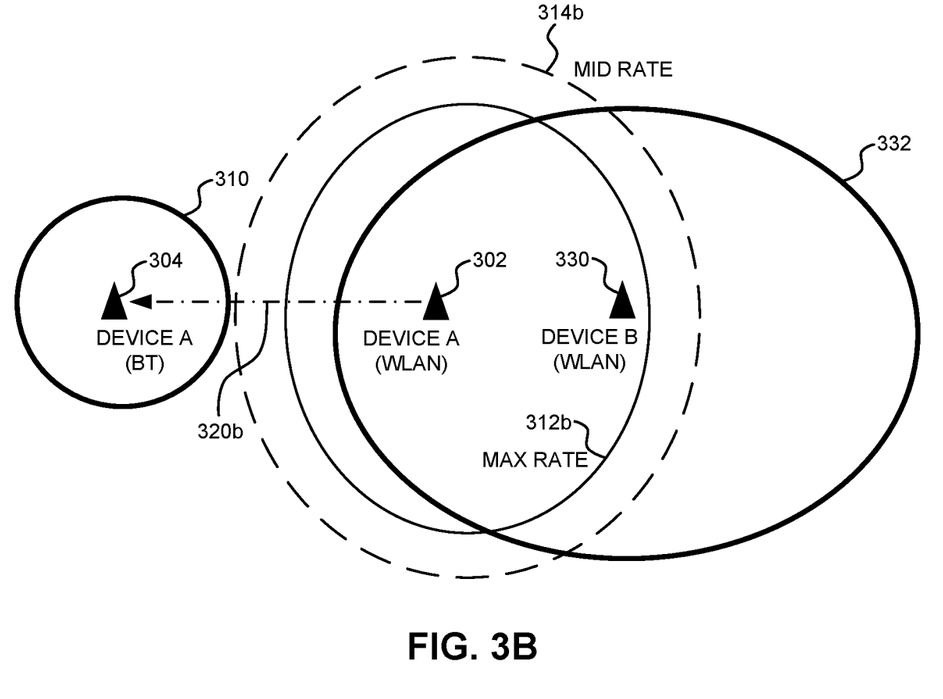

FIGS. 3A and 3B illustrate cell sizes before and after adjusting a WLAN transceiver cell size, respectively, according to an embodiment. As illustrated in FIG. 3A, a device A includes a WLAN transceiver 302 and a Bluetooth transceiver 304. A peer WLAN device B 330 may be configured to wirelessly communicate with WLAN transceiver 302. For example, WLAN device B 330 may be provided by a WLAN device 230, WLAN transceiver 302 may be provided by a WLAN transceiver 202 of device 200a or 200b, and Bluetooth transceiver 304 may be provided by a Bluetooth transceiver 204 of device 200a or 200b of FIG. 2A or 2B.

The cell size of Bluetooth transceiver 304 is indicated at 310. The cell size of WLAN transceiver 330 is indicated at 332. The cell size of WLAN transceiver 302 at a max rate is indicated at 312a, and the cell size of WLAN transceiver 302 at a mid rate less than the max rate is indicated at 314a. The cell size 314a of WLAN transceiver 302 at the mid rate is larger than the cell size 312a of WLAN transceiver 302 at the max rate. As shown in FIG. 3A, the cell size of WLAN transceiver 302 is not optimal, such that WLAN transceiver 302 may cause interference as indicated at 320a with the Bluetooth transceiver 304 co-located with the WLAN transceiver 302. If the cell size of WLAN transceiver 302 were optimized, the WLAN transceiver 302 would cause less interference with the Bluetooth transceiver 304 while still reaching WLAN transceiver 330. By reducing the interference, there would be no need to share the medium between the Bluetooth transceiver 304 and the WLAN transceiver 302, thereby improving the performance of both the Bluetooth transceiver 304 and the WLAN transceiver 302.

As illustrated in FIG. 3B, by properly adjusting the cell size of the WLAN transceiver 302 from 312a to 312b and from 314a to 314b by adjusting (e.g., reducing) the transmit power of the WLAN transceiver 302, Bluetooth transceiver 304 is less effected by WLAN transceiver 302 as indicated by reduced interference at 320b. The optimal cell size of WLAN transceiver 302 improves both the WLAN transceiver 302 performance and the Bluetooth transceiver 304 performance. In this example, the Wi-Fi medium occupancy of WLAN transmission may be 100%, thereby maximizing throughput compared to the configuration of FIG. 3A.

Figure 4A:
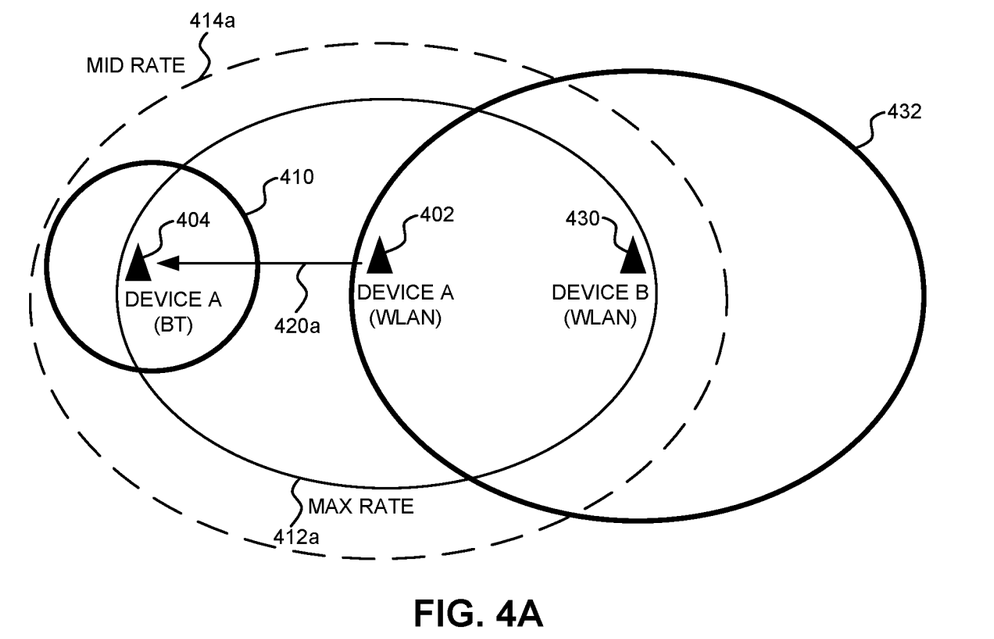
FIGS. 4A and 4B illustrate cell sizes before and after adjusting a WLAN transceiver cell size, respectively, according to another embodiment.
Figure 4B:
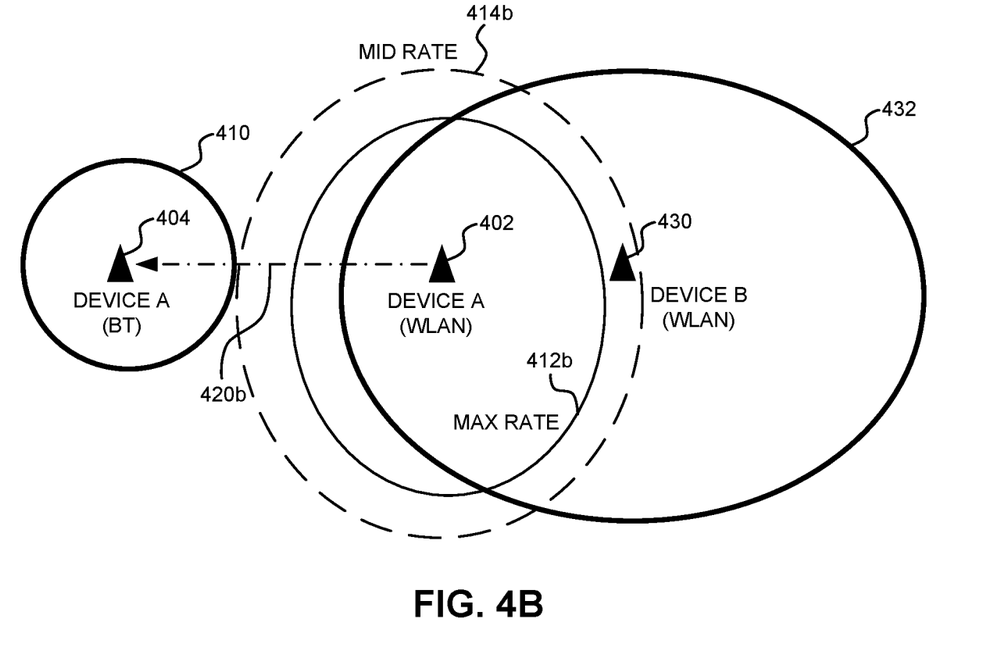

FIGS. 4A and 4B illustrate cell sizes before and after adjusting a WLAN transceiver cell size, respectively, according to another embodiment. As illustrated in FIG. 4A, a device A includes a WLAN transceiver 402 and a Bluetooth transceiver 404. A peer WLAN device B 430 may be configured to wirelessly communicate with WLAN transceiver 402. For example, WLAN device B 430 may be provided by a WLAN device 230, WLAN transceiver 402 may be provided by a WLAN transceiver 202 of device 200a or 200b, and Bluetooth transceiver 404 may be provided by a Bluetooth transceiver 204 of device 200a or 200b of FIG. 2A or 2B.

The cell size of Bluetooth transceiver 404 is indicated at 410. The cell size of WLAN transceiver 430 is indicated at 432. The cell size of WLAN transceiver 402 at a max rate is indicated at 412a, and the cell size of WLAN transceiver 402 at a mid rate less than the max rate is indicated at 414a. The cell size 414a of WLAN transceiver 402 at the mid rate is larger than the cell size 412a of WLAN transceiver 402 at the max rate. As shown in FIG. 4A, the cell size of WLAN transceiver 402 is not optimal, such that WLAN transceiver 402 may cause interference as indicated at 420a with the Bluetooth transceiver 404 co-located with the WLAN transceiver 402. If the cell size of WLAN transceiver 402 were optimized, the WLAN transceiver 402 would cause less interference with the Bluetooth transceiver 404 while still reaching WLAN transceiver 430. By reducing the interference, there would be no need to share the medium between the Bluetooth transceiver 404 and the WLAN transceiver 402, thereby improving the performance of both the Bluetooth transceiver 404 and the WLAN transceiver 402. In this example, however, if the cell size 412a for the max rate of WLAN transceiver 402 was reduced further, the cell area corresponding to the max rate would be outside the area for communications with WLAN transceiver 430.

As illustrated in FIG. 4B, by properly adjusting the cell size of the WLAN transceiver 402 from 412a to 412b and from 414a to 414b by adjusting (e.g., reducing) the transmit power of the WLAN transceiver 402, Bluetooth transceiver 404 is less effected by WLAN transceiver 402 as indicated by reduced interference at 420b. In this example, however, since the cell area 412b of WLAN transceiver 402 corresponding to the max rate cannot reach WLAN transceiver 430, the rate of WLAN transceiver 402 is reduced to the mid rate with cell area 414b. With the rate reduced to the mid rate, interference with the Bluetooth transceiver 404 is reduced and WLAN transceiver 402 can reach WLAN transceiver 430. In this example, there is no impact in WLAN transmit throughput compared to the configuration of FIG. 4A. The Wi-Fi medium occupancy of WLAN transmission may be 100%. Though the WLAN rate is reduced, the Wi-Fi medium occupancy is increased, hence the overall WLAN throughput may remain the same. By reducing interference, however, Bluetooth performance is improved, thereby improving the latency compared to the configuration of FIG. 4A.

Figure 5:
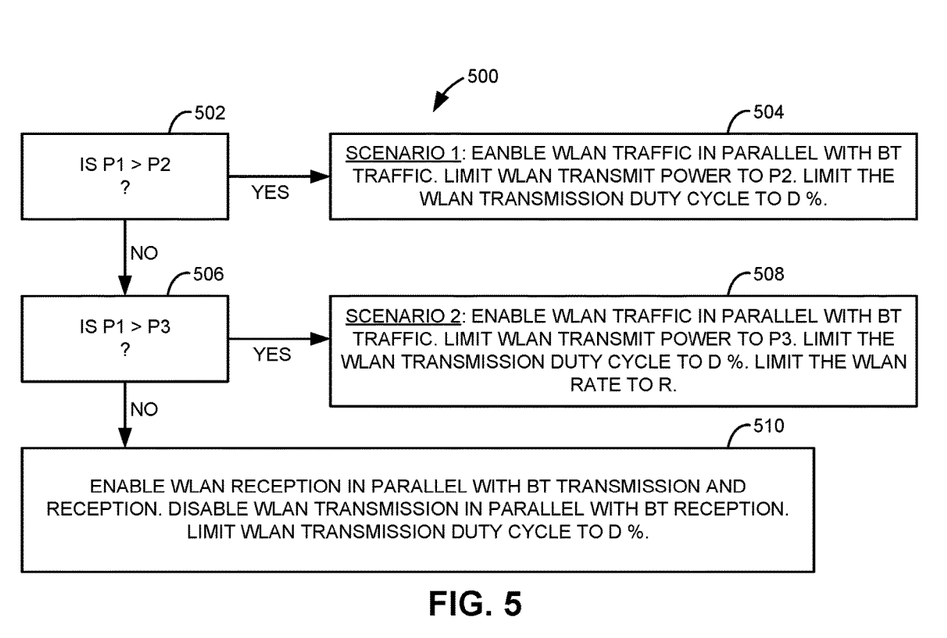
FIG. 5 is a flow diagram illustrating one example of a method for adjusting a cell size.

FIG. 5 is a flow diagram illustrating one example of a method 500 for adjusting a WLAN transceiver cell size. Method 500 may be implemented by device 100 of FIG. 1 or device 200a or 200b of FIGS. 2A and 2B. The method might be in the form of computer-readable instructions, e.g., stored to a memory of device 100, 200a, or 200b. Such computer-readable instructions might be executed by a controller, e.g., the controller 106 or 206 to cause the device 100, 200a, or 200b to perform the method.

Method 500 may be used for systems with moderate isolation (e.g., greater than 20 dB, such as 25 dB) between co-located WLAN and Bluetooth transceivers. For systems with moderate isolation, typically WLAN reception occurs in parallel with Bluetooth traffic while WLAN transmission occurs in a time division multiplexed fashion with Bluetooth traffic. If the cell size of the WLAN transceiver is optimized using method 500, then WLAN transmission may occur in parallel with Bluetooth traffic, thereby increasing WLAN throughput and also improving Bluetooth latency without increasing cost.

In the following FIG. 5, P1 represents the maximum WLAN transmit power to sustain Bluetooth traffic at a given Bluetooth metric. The given Bluetooth metric may be a Bluetooth RSSI or a Bluetooth SNR. P2 represents a WLAN transmit power to sustain WLAN traffic at a highest WLAN rate for a given WLAN metric. The WLAN metric may include a WLAN RSSI, a WLAN SNR, and/or a delay spread and condition number of the channel. X represents a WLAN transmission period in percent. R equals X % of the highest WLAN rate of the WLAN transceiver. P3 represents the WLAN transmit power to sustain the rate R at the given WLAN metric. D represents the WLAN transmission duty cycle. WLAN transmission may be limited to D % duty cycle (e.g., between 60-100%) when WLAN transmission is occurring in parallel with Bluetooth transmission to avoid damage (e.g., due to overheating) of the Bluetooth transceiver.

Bluetooth RSSI or WLAN RSSI is a parameter which aids in measuring the signal strength of the received Bluetooth or WLAN signal. Bluetooth SNR or WLAN SNR is a measure of unwanted noise in addition to the signal of interest. Adjacent Channel Interference (ACI) signal strength measures the adjacent channel interference, which may be useful in determining whether a WLAN transceiver can receive a particular packet at a particular RSSI. When a signal is transmitted from a source to a destination, the signal undergoes several obstacles in its path and as a result the signal may have multiple paths to travel due to reflection, etc. This effect is called multi-path effect, so the same signal may arrive at the destination with some delay. Since there are multiple paths to travel, the same signal may arrive with different delays. Delay spread is the Root Mean Square (RMS) of all such delays. This measure may be used to understand the channel quality and thereby help to determine the decodability of a packet. Condition number of the channel measures the condition number of the channel matrix used (typically when it is a Multiple-Input and Multiple-Output (MIMO) channel), which helps to determine whether a packet will be decoded or not.

At 502, method 500 determines whether P1 is greater than P2 (e.g., determines whether a maximum WLAN transmit power to sustain Bluetooth traffic at a given Bluetooth metric is greater than a WLAN transmit power to sustain WLAN traffic at a highest WLAN rate for a given WLAN metric). In response to P1 being greater than P2, at 504 method 500 implements scenario 1. Scenario 1 was previously described and illustrated with reference to FIG. 3B. In scenario 1, method 500 enables WLAN traffic in parallel with Bluetooth traffic, limits WLAN transmit power to P2 (e.g., limits WLAN transmit power to the WLAN transmit power to sustain WLAN traffic at the highest rate for the WLAN metric), and limits the transmission duty cycle to D % (e.g., limits the WLAN transmission duty cycle to a first (e.g., predetermined) duty cycle during Bluetooth transmission).

In one example, where isolation (e.g., 220 of FIGS. 2A and 2B) equals 25 dB, Bluetooth RSSI equals −60 dBm, WLAN RSSI equals −65 dBm, P1 equals 13 dBm, P2 equals 9 dBm, current WLAN transmit power equals 13 dBm, highest WLAN rate equals 65 Mbps, and D equals 100%, the throughput for a Transmission Control Protocol (TCP) transmission in Advanced Audio Distribution Profile (A2DP) mode or extended Synchronous Connection Orientated (eSCO) mode may be improved by 26% when the cell size is optimized using scenario 1 compared to when the cell size is not optimized.

In response to P1 being less than P2, then at 506 method 500 includes determining whether P1 is greater than P3 (e.g., determines whether the maximum WLAN transmit power to sustain Bluetooth traffic at the given Bluetooth metric is greater than a WLAN transmit power to sustain a first percentage of the highest WLAN rate). In response to P1 being greater than P3, at 508 method 500 implements scenario 2. Scenario 2 was previously described and illustrated with reference to FIG. 4B. In scenario 2, method 500 enables WLAN traffic in parallel with Bluetooth traffic, limits WLAN transmit power to P3 (e.g., limits WLAN transmit power to the WLAN transmit power to sustain the first percentage of the highest WLAN rate), limits the transmission duty cycle to D % (e.g., limits the WLAN transmission duty cycle to the first duty cycle during Bluetooth transmission), and limits the WLAN rate to R (e.g., limits the WLAN rate to the first percentage of the highest WLAN rate).

In one example, isolation (e.g., 220 of FIGS. 2A and 2B) equals 25 dB, Bluetooth RSSI equals −65 dBm, WLAN RSSI equals −70 dBm, P1 equals 8 dBm, P2 equals 13 dBm, P3 equals 7 dBm, current WLAN transmit power equals 8 dBm, R equals 52 Mbps, and D equals 100%. The number of delayed packets is typically dependent on isochronous duration, which translates to latency. This can be evident in a TDM scenario whenever there is a WLAN transmission operation. But by implementing scenario 2, concurrency of WLAN transmission in parallel with Bluetooth traffic is achieved, thereby preventing delayed packets. Thus, a 100% improvement in the number of delayed packets may be achieved with scenario 2.

In response to P1 being less than P3, then at 510 method 500 enables WLAN reception in parallel with Bluetooth transmission and reception, disables WLAN transmission in parallel with Bluetooth reception, and limits WLAN transmission duty cycle to D % (e.g., limits the WLAN transmission duty cycle to the first duty cycle during Bluetooth transmission). WLAN transmission in parallel with Bluetooth transmission is enabled.

Figure 6:
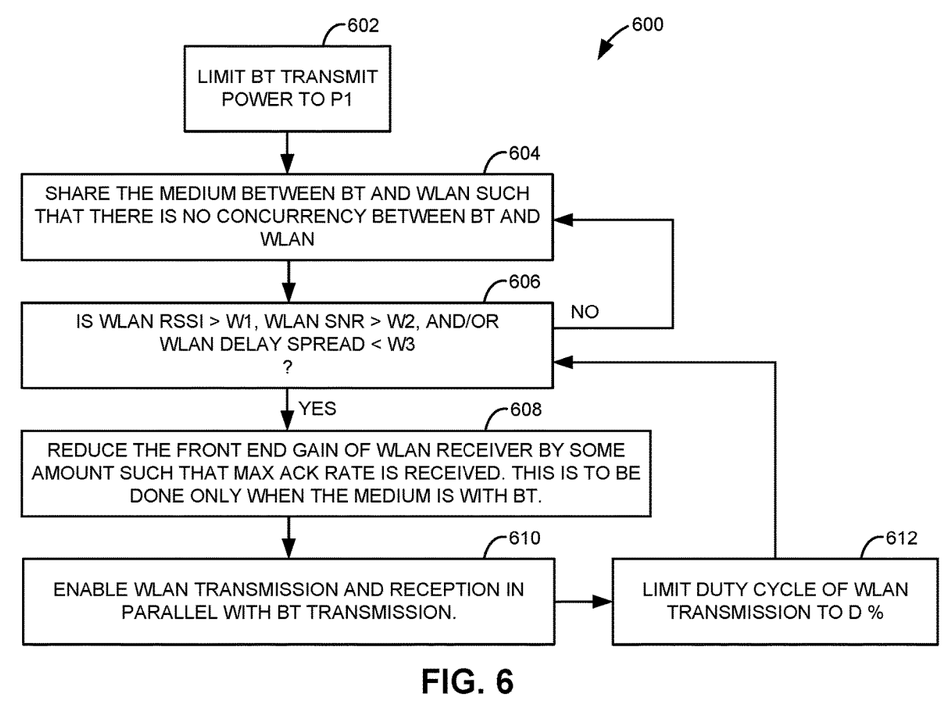
FIG. 6 is a flow diagram illustrating another example of a method for adjusting a cell size.

FIG. 6 is a flow diagram illustrating another example of a method 600 for adjusting a cell size. Method 600 may be implemented by device 100 of FIG. 1 or device 200a or 200b of FIGS. 2A and 2B. The method might be in the form of computer-readable instructions, e.g., stored to a memory of device 100, 200a, or 200b. Such computer-readable instructions might be executed by a controller, e.g., the controller 106 or 206 to cause the device 100, 200a, or 200b to perform the method.

Method 600 may be used for systems with low isolation (e.g., less than 20 dB, such as 10-15 dB) between co-located WLAN and Bluetooth transceivers. For systems with low isolation, typically WLAN traffic occurs in a time division multiplexed fashion with Bluetooth traffic. If the cell size of the transceivers is optimized using method 600, then WLAN transmission and reception may occur in parallel with Bluetooth transmission, thereby increasing WLAN throughput and also improving Bluetooth latency without increasing cost.

In the following FIG. 6, P1 represents the minimum Bluetooth transmit power to sustain Bluetooth traffic at a given Bluetooth metric. The given Bluetooth metric may be a Bluetooth RSSI or a Bluetooth SNR. W1 represents a WLAN RSSI up to which an acknowledge rate of 6 Mbps can be received after reducing the front end gain of the WLAN receiver to avoid saturation of the front end element at the Bluetooth transmit power of P1 and with the given isolation (e.g., 220 of FIGS. 2A and 2B). W2 represents a WLAN SNR up to which an acknowledge rate of 6 Mbps can be received after reducing the front end gain of the WLAN receiver by some amount to avoid saturation of the front end element at the Bluetooth transmit power of P1 and with the given isolation. W3 represents a delay spread and condition number of the channel seen by the WLAN transceiver up to which an acknowledge rate of 6 Mbps can be received after reducing the front end gain of the WLAN receiver by some amount to avoid saturation of the front end element at the Bluetooth transmit power of P1 and with the given isolation. D represents the WLAN transmission duty cycle. The WLAN transmission is limited to D % duty cycle (e.g., between 60-100%) when WLAN transmission is occurring in parallel with Bluetooth transmission to avoid damage (e.g., due to overheating) of the Bluetooth transceiver.

At 602, method 600 limits Bluetooth transmit power to P1 (e.g., limits Bluetooth transmit power to a first (e.g., predetermined) transmit power to sustain Bluetooth traffic at a given Bluetooth metric). At 604, method 600 shares the medium between Bluetooth and WLAN such that there is no concurrency between Bluetooth and WLAN (e.g., disables WLAN traffic in parallel with Bluetooth traffic). At 606, method 600 determines whether WLAN RSSI is greater than W1, WLAN SNR is greater than W2, and/or WLAN delay spread is less than W3. In response to WLAN RSSI being less than W1, WLAN SNR being less than W2, and/or WLAN delay spread being greater than W3, then method 600 returns to 604, where the medium is shared between Bluetooth and WLAN such that there is no concurrency between Bluetooth and WLAN. In response to WLAN RSSI being greater than W1, WLAN SNR being greater than W2, and/or WLAN delay spread being less than W3, then at 608 method 600 reduces the front end gain of the WLAN receiver by some amount such that a max acknowledge rate is received. The front end gain of the WLAN receiver is reduced only when the medium is with Bluetooth (e.g., during Bluetooth transmission). At 610, method 600 enables WLAN traffic (transmission and reception) in parallel with Bluetooth transmission. At 612, method 600 limits the duty cycle of WLAN transmission to D % (e.g., limits the WLAN transmission duty cycle to a first (e.g., predetermined) duty cycle during Bluetooth transmission). Method 612 then returns to 606, where method 600 determines whether WLAN RSSI is greater than W1, WLAN SNR is greater than W2, and/or WLAN delay spread is less than W3.

Figure 7A:
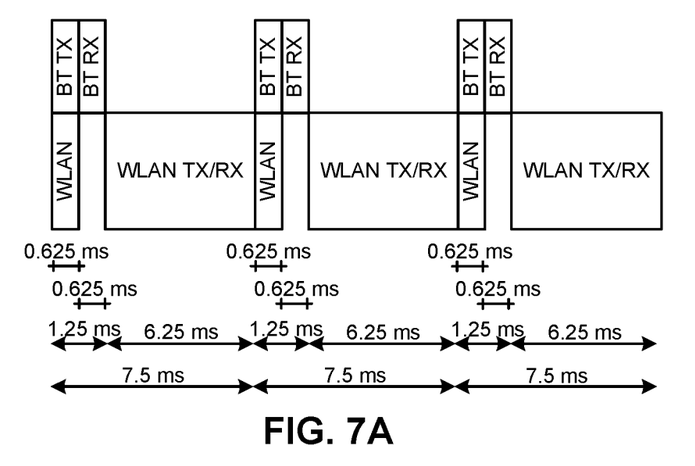
FIGS. 7A-7C are timing diagrams illustrating the operation of Bluetooth and WLAN transceivers for different Bluetooth profiles after adjusting a cell size.

FIG. 7A is a timing diagram illustrating one example of the operation of Bluetooth and WLAN transceivers using Bluetooth profile eSCO after adjusting a cell size. In this example, the over the air time is 7.5 ms. Without cell size optimization, WLAN traffic (Tx/Rx) in parallel with Bluetooth transmission (BT Tx) is disabled, the WLAN Tx/Rx duration equals 6.25 ms and the Bluetooth Tx/Rx duration equals 1.25 ms. With cell size optimization, WLAN traffic in parallel with Bluetooth transmission is enabled, the WLAN Tx/Rx duration equals 6.875 ms (e.g., 6.25 ms plus 0.625 ms), and the Bluetooth Tx/Rx duration equals 1.25 ms. Accordingly, the WLAN air time improvement is 10% as given by [(BT Tx duration)/(WLAN Tx/Rx duration)] *100%, which is [0.625 ms/6.25 ms]*100% in this example.

Figure 7B:
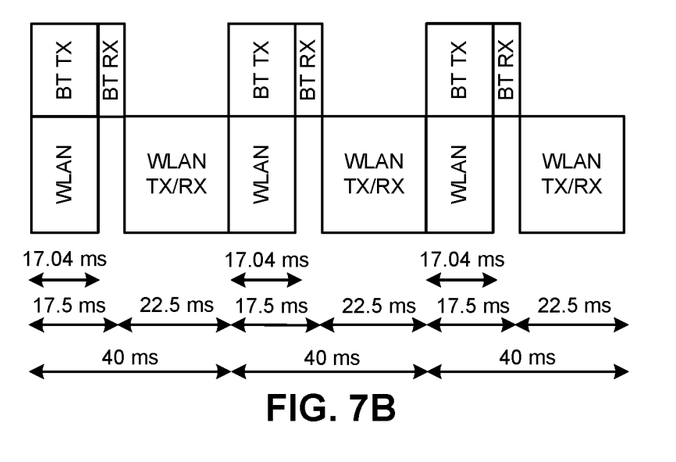

FIG. 7B is a timing diagram illustrating one example of the operation of Bluetooth and WLAN transceivers using Bluetooth profile Bluetooth Low Energy (BLE) transmit unidirectional after adjusting a cell size. In this example, Bluetooth activity is LE (S=8), payload is 251 octets, connection interval is 40 ms, and Bluetooth traffic is unidirectional (DUT-Tx). In this example, the over the air time is 40 ms. Without cell size optimization, WLAN traffic (Tx/Rx) in parallel with Bluetooth transmission (BT Tx) is disabled, WLAN Tx/Rx duration equals 22.5 ms and Bluetooth Tx/Rx duration equals 17.5 ms. With cell size optimization, WLAN traffic in parallel with Bluetooth transmission is enabled, WLAN Tx/Rx duration equals 39.5 ms (e.g., 22.5 ms plus 17.04 ms) and Bluetooth Tx/Rx duration equals 17.5 ms. Accordingly, the WLAN air time improvement is 77.78% as given by [(BT Tx duration)/(WLAN Tx/Rx duration)]*100%, which is [17.5 ms/22.5 ms]*100% in this example.

Figure 7C:
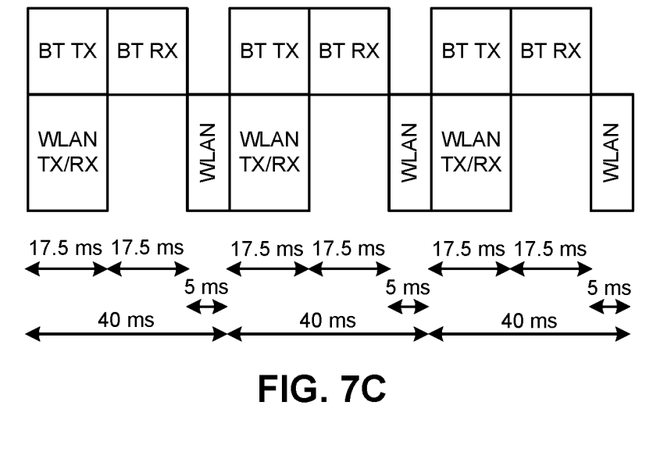

FIG. 7C is a timing diagram illustrating one example of the operation of Bluetooth and WLAN transceivers using Bluetooth profile BLE bi-directional after adjusting a cell size. In this example, Bluetooth activity is LE (S=8), payload is 251 octets, connection interval is 40 ms, and Bluetooth traffic is bi-directional. In this example, the over the air time is 40 ms. Without cell size optimization, WLAN traffic (Tx/Rx) in parallel with Bluetooth transmission (BT Tx) is disabled, WLAN Tx/Rx duration equals 5 ms and Bluetooth Tx/Rx duration equals 35 ms. With cell size optimization, WLAN traffic in parallel with Bluetooth transmission is enabled, the WLAN Tx/Rx duration equals 22.5 ms and Bluetooth Tx/Rx duration equals 35 ms. Accordingly, the WLAN air time improvement is 340% as given by [(BT Tx duration)/(WLAN Tx/Rx duration)]*100%, which is [17 ms/5 ms]*100% in this example.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A device comprising: a Bluetooth transceiver; a Wireless Local Area Network (WLAN) transceiver proximate the Bluetooth transceiver; and a controller communicatively coupled to the Bluetooth transceiver and the WLAN transceiver, the controller configured to adjust a cell size of the WLAN transceiver or the Bluetooth transceiver to reduce interference between WLAN transceiver traffic and Bluetooth transceiver traffic, wherein the controller is configured to adjust the cell size of the WLAN transceiver by reducing a WLAN transmission rate from a first rate to a second rate.

2. The device of claim 1, wherein the controller is configured to adjust the cell size of the WLAN transceiver by reducing a WLAN transmit power from a first level to a second level.

3. The device of claim 1, wherein the controller is configured to adjust the cell size of the Bluetooth transceiver by reducing a Bluetooth transmit power from a first level to a second level.

4. The device of claim 1, wherein the controller is configured to limit a WLAN transmission duty cycle to a first duty cycle during Bluetooth transmissions.

5. The device of claim 1, further comprising:
a 3-wire or SECI/GCI interface between the Bluetooth transceiver and the WLAN transceiver.

* * * * *